INVENTOR.
PIERRE RENE HEYMES

Fig. 2
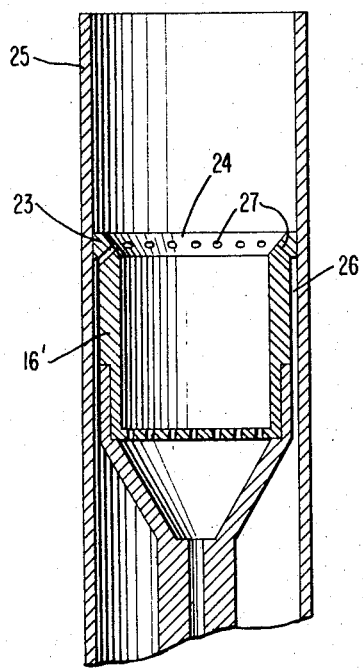
Fig. 4
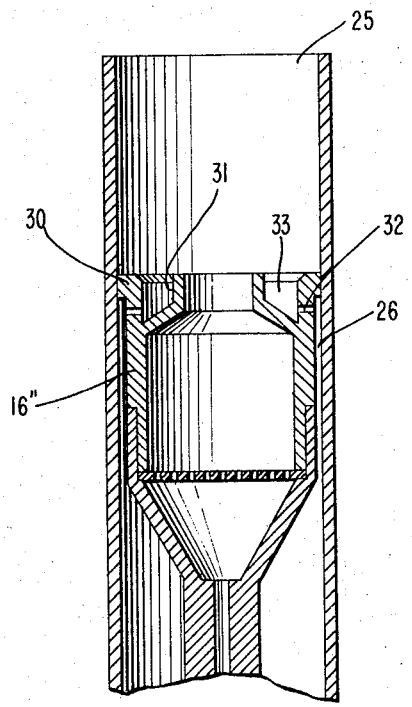
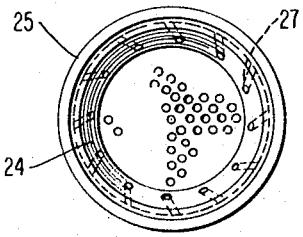
Fig. 3
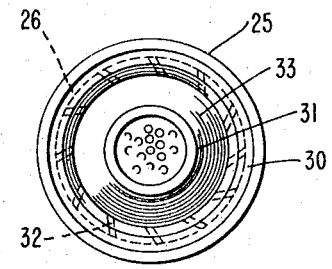
Fig. 5
INVENTOR.
PIERRE RENE HEYMES
BY Bauer and Seymour
ATTORNEYS

INVENTOR.
PIERRE RENE HEYMES

United States Patent Office 3,449,101
Patented June 10, 1969

3,449,101
PROCESS AND APPARATUS FOR SUPPORTING SHEET MATERIAL ON A GAS BED
Pierre Rene Heymes, Paris, France, assignor to Compagnie de Saint-Gobain, Neuilly-sur-Seine, France
Filed Aug. 19, 1965, Ser. No. 481,007
Claims priority, application France, Sept. 8, 1964, 987,413
Int. Cl. C03b 39/00
U.S. Cl. 65—25           14 Claims

ABSTRACT OF THE DISCLOSURE

An operation of supporting a glass sheet over a pressurized bed of hot gas formed by burner cups aligned with their open ends in a common surface.

---

In its general form this invention relates to a method and apparatus for supporting sheet material out of contact with solid objects. In its preferred form the invention relates to supporting a sheet of glass in a hot, plastic state while it undergoes thermal treatment. The invention is particularly useful in supporting a newly formed sheet of glass as it is drawn, while being cooled, toward ordinary handling machinery. This invention is an improvement over a known process of supporting a sheet of material on a cushion of gas issuing from a plurality of blowers. That process has a number of imperfections including heat loss and parasitic dilatation.

Parasitic dilatation is particularly undesirable because the hot gas which enters the pressure box which carries the blowing orifices causes changes of dimension which alter the positions and sizes of the orifices, establishing differences in the output of different orifices, and differences in the effective gas supply delivered below the sheet leading to an unequal distribution of the thermal treatment which the sheet is undergoing and even permitting mechanical contact in some areas between the sheet and the blowing surface. As the sheet may be in a plastic state and the blowing surface. As the sheet may be in a plastic state such contact damages its surface and causes a material loss.

It is an object of this invention to provide an improved method of supporting a sheet of material on a cushion of gas and to provide an improved apparatus for carrying out the process. Another object is to provide a plurality of sources for the gas cushion, which supports the sheet material, which are controllable in temperature and velocity so as to produce a level, gaseous clushion upon which the sheet rides. Another object is to avoid the disadvantages which are inherent in the prior art processes and apparatus. A further object is to control the temperatures at which the apparatus operates in order to lengthen the life of the apparatus itself and to adapt the temperature of the gaseous cushion to the needs of each stage of the thermal treatment which the sheet material undergoes.

As the invention is particularly adapted to the support and heat treatment of glass sheet between its formation and its delivery to ordinary handling apparatus, the invention will be described in relation to that process without detracting from the generality of its utility. In that process a glass sheet may be rolled out of molten glass at the entrance to an oven, progressively cooled as it passes through the oven, and discharged in a hard state at the downstream end.

The objects of the invention are accomplished generally speaking by a method of supporting a sheet horizontally which comprises burning fuel within a chamber having an orifice at the top and resting the sheet on the products of combustion issuing from the orifice of the chamber, and by apparatus for supporting sheeting horizontally which comprises a plurality of burning chambers having horizontally aligned, upwardly opening orifices, and means to burn fuel in the chambers.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical section through a part of an apparatus of a type characteristic of the invention;

FIG. 2 is an enlarged axial section through a burner;

FIG. 3 is a plan view of the burner of FIG. 2;

FIG. 4 is a vertical section through another modified form of burner;

FIG. 5 is a plan view of the burner of FIG. 4;

Figure 1:
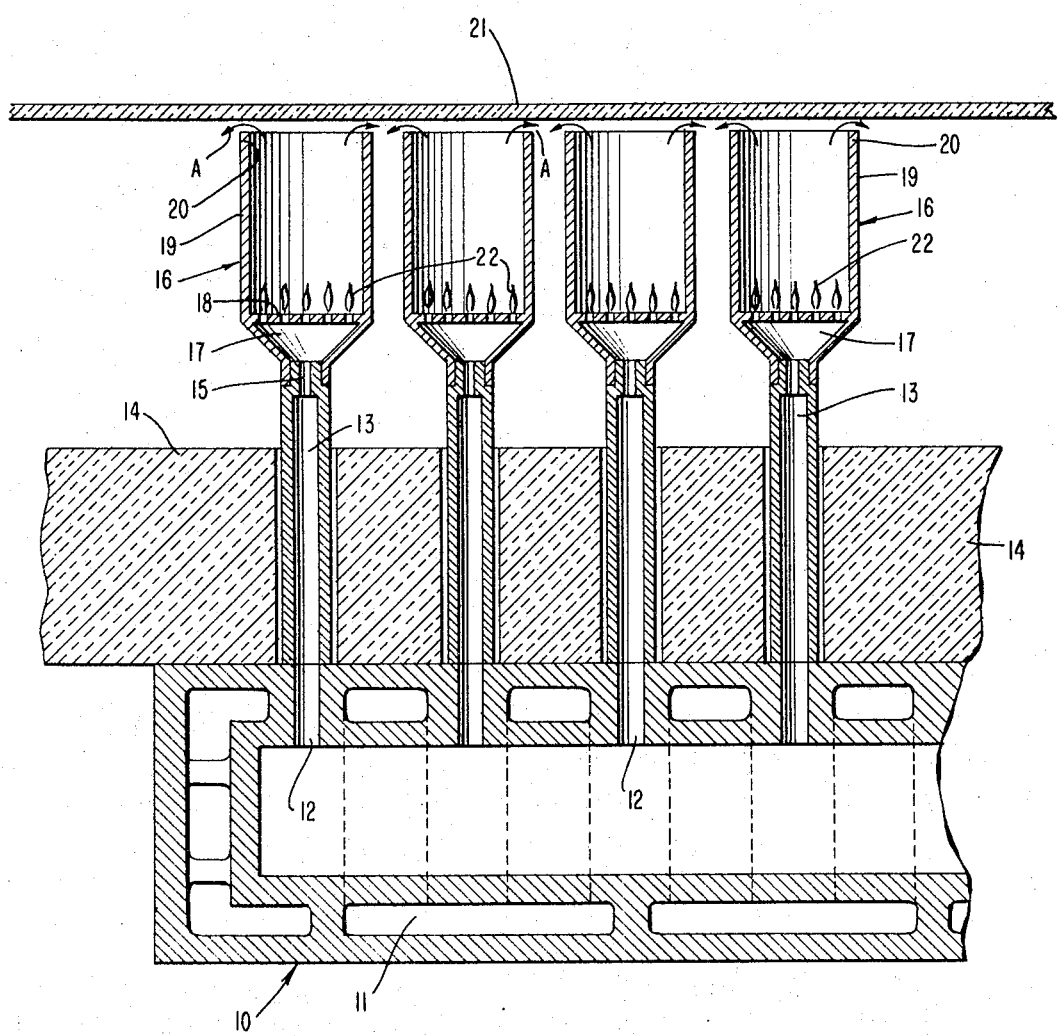

In FIG. 1 there is provided a pressure chamber 10 having double walls which provide cooling chamber 11 through which a cooling fluid may flow, and with vertical conduits 12 which extend upwardly through its top. Mounted upon the chamber 10 in alignment with the holes 12 are tubes 13 which extend through a layer 14 of thermal insulation and terminate in a throat 15 of reduced diameter. Mounted in a gas tight relation to the end of tube 13 is a burning chamber 16 which has a conical section 17, which is surmounted by a burner plate or mesh 18 and with a cylindrical part 19 which is open at the top 20 and furnishes an upwardly directed, horizontally aligned orifice out of which gases proceeding from the burner plate may flow. A glass sheet 21 is moved over the burner cups after they have been lighted, and the gaseous products of combustion issuing from the combustion chambers 16 support the glass sheet out of contact with any material object.

A plurality of these burners are arranged side by side with their discharge orifices in horizontal alignment, their number and spacing being such as to furnish substantial and uniform support throughout the supported area of the sheet. The sheet is sufficiently stiff, even at its hottest, to permit some spacing of the nozzles without sagging.

The operation of this device is as follows:

The pressure chamber 10 receives from a source, not shown, a combustible mixture of fuel and air, for instance illuminating gas and air, or a carbureted mixture of gasoline and air. The pressure within the chamber 10 is to be kept uniform and as a consequence the flow of fuel through the feeding tubes 13 will be uniform. As the fuel makes its way through the burner plates 18 it is ignited by any satisfactory method and develops a plurality of steady flames 22 of similar intensity. As the flow of fuel is reasonably uniform through all the burner plates the quantity of heat developed in each burning chamber will be substantially alike. As the gases burn, the products of combustion expand and are discharged upward toward the orifice 20 through which they pass in the directions indicated by the arrows A. The sheet 21 is drawn over the orifice of the burners and settles downward upon the gases issuing from them, tending to increase the pressure within the chambers 19 until the sheet floats on an adequately uniform cushion of gas. The fuel mixture is delivered to the pressure chamber 10 at such flow as will sustain the sheet 21 at a selected level above the tops of the burners. To raise the level of the sheet, the flow of combustible mixture into the chambers is increased in order to increase the size and intensity of the flames 22 as well as the temperature within the chamber and the amount of combustion gases produced. Reducing the flow of gases into chamber 10 will produce the opposite effect and will lower the sheet 21 toward the tops of the burners. The gases escape from beneath the sheet, flow downward between the burners and toward the top of the pressure chamber 10, encountering the heat resistant body 14 and flowing off horizontally to regenerators or to such other use as is appropriate to their temperature and condition. The chamber 10, being thus protected, may be made of ordinary material such as cast iron or other materials which are of reasonable cost.

In FIGS. 2 and 3 are illustrated a form of the invention embodying an improved burner 16', which may be regarded as similar to burner 16, each of which is provided with a flange 23, of somewhat greater diameter, having an internal bevel 24. The ring flange 23 fits the inside of a tube 25, providing a space 26 between the wall of the tube and the wall of the burner 16'. Drilled through the flange and opening in the bevel 24 are holes 27 which connect the space 26 with the top of the burning chamber but within the extension of the tube 25. A second gas may be forced from a second source into the space 26 to mix with the gases of combustion as they issue from the burner 16'. The holes 27 may be diagonally drilled, as indicated in FIG. 3, so that they enter the burning gases diagonally and give a whirling motion to them, causing improved mixing. An apparatus for supplying the additional gas is described in FIG. 6.

In FIG. 4 is another form of the invention which embodies a modified form of burner 16" having toward its upper end an outer collar 30 which is tight against the wall of tube 25, and an inner collar 31 which provides an orifice of comparatively small section through which the products of combustion from chamber 16" are discharged. The space 26 between the tubes 25 and the wall of the burner is supplied with gas as in FIG. 3 and a series of holes 32 are provided in the wall of the ring 30 through which they flow into the annular space 33 between the inner and outer collars. The holes 32 are also shown in the figure to be diagonally drilled so as to provide a whirling motion in the mixed auxiliary and burnt gases.

Figure 6:
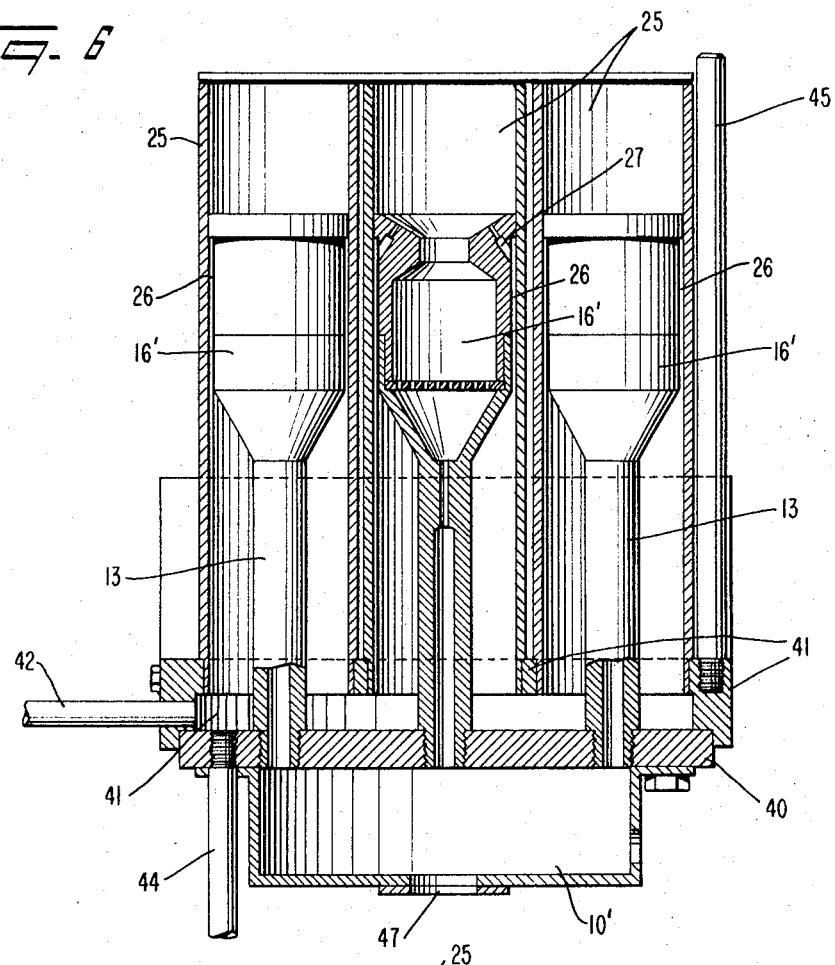
FIG. 6 is an elevation, partly in section, of a particularly efficient type of unit.
Figure 7:
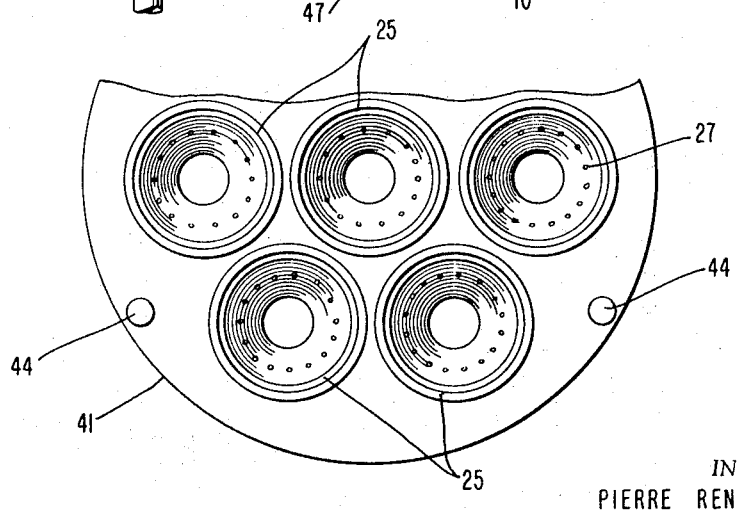
FIG. 7 is a partial plan view of the apparatus of FIG. 6.

In FIGS. 6 and 7 is shown a particularly desirable form of the invention, applicable in general to what has been hereinabove described, in which there are provided a lower chamber 10' upon which are mounted the conduits 13 and the burners 16', a gap being provided between the tubes 25 and the chamber 16'.

The upper wall of chamber 10' is provided by a plate 40 in which the tubes 13 are mounted. Above that plate is another 41 in which are drilled seven holes which receive seven tubes 25 as partially indicated in FIG. 7. The lower chamber 10' is supplied through port 47 with a fuel mixture under pressure which is delivered to the tubes 13. The upper chamber 41 is supplied through a conduit 42 with an auxiliary gas which flows upward within the tubes 25 through the gaps 26 and holes 27 to mingle with the burning gases and products of combustion. Supports 44 sustain the system from below and support 45 sustains it from above according to convenience. These units can be assembled and transported as such, and are easily mounted and dismounted in whatever position is deemed advantageous.

It will be perceived from the foregoing description that the present invention avoids the imperfections of the prior art and provides a new process for supporting material on a gaseous cushion, particularly when it is to undergo a thermal treatment. This new process involves introducing fluids in the interior of chambers having open tops through which they flow to form a gaseous cushion. The preferred method of operation is to burn fuel within these chambers, using the products of combustion to support the sheet, the products of combustion issuing from the various chambers being at substantially the same pressure, temperature, and velocity and forming a sufficiently uniform cushion. The weight of the sheet, being itself uniform, contributes to this perfection of operation by providing by its weight a certain increase in pressure in the gases in the burning chambers. The discharge orifices of the burning chambers are preferably horizontal and preferably aligned in one plane, in the forms of the invention which have been described.

Due to the localization of combustion in the interior of these burning chambers, the parasitic dilations which are characteristic of the prior art are avoided.

The temperature of the gases need not be very high because of the moderate fuel requirements of the system, and they will be substantially reduced in temperature before they engage the top of the pressure chamber.

According to another characteristic of the invention the burner is provided with a multiplicity of orifices through which the gas may pass and which act to prevent flash-back. The reduction in section will cause an increase in speed sufficient to provide stable flames inside the burner chamber. For example, the gas issuing from a burner grille tends to distribute itself throughout the whole of the bottom of the chamber, but its speed decreases as it expands in the chamber and the flame is established of such dimensions that the speed of the gas is equal to the speed of propagation of the flame.

This flame, and the products of combustion which are derived from it, provide a gaseous cushion which will sustain the weight of a sheet, for instance of glass, as the gases issue from the burner chambers. The increase in volume of these gases as they expand provides a sufficiently high rate of flow at the level of discharge in spite of a relatively low rate of fuel flow.

For example it is possible to support a sheet of glass 5.7 mm. thick at a height of 5 to 10 mm. above the discharge orifice with a supply of only 6 l. of propane per hour and 120 l. of air per hour, these being injected into chambers of about 10 cc. capacity and 25 mm. diameter. The temperature of the gas at the bottom of the supported sheet may be regulated by changing the composition of the combustible mixture, and this can also be varied by adding other gases, for instance an excess of air, water spray, or water vapor, which do not participate in the combustion.

It is advantageous to introduce a gas which does not participate in the combustion above the combustion zone, for instance cold air which dilutes the products of combustion, lowers their temperature, but is still capable of maintaining a satisfactory distance between the sheet and the combustion chambers. Because of this mode of operation, the level of the sheet above the discharge orifice and the temperature of the gas issuing from the combustion chamber become independently variable by the conjoined control of the combustion of the gas and the supply of the auxiliary gas introduced at the upper level of the combustion chamber.

Although the description has thus far proceeded as though gases were being used it is equally possible to use liquid fuels such as carbureted gasoline, or fuel oil, or to supply satisfactory burners with powdered solid fuels.

The auxiliary materials, injected into or about the burning or burned gases may themselves be gases or liquids and mingle to a greater or lesser extent depending upon the direction of the holes and the products of combustion, thus diluting them. The auxiliary gases can also be used to increase the pressure within the burning chamber without increasing the temperature thereof.

In FIG. 6 the holes 27 are conically arranged so that the summit of the cone will be situated above the axis of the burning chamber and its orifices, insuring a substantially even mixture of all the gases.

The arrangement of FIGS. 6 and 7 greatly simplifies the problems of construction and engineering problems involved.

It is within the purview of the invention, that upon occasion, certain of the tubes will be supplied with gases which are not burning or burned and which may be at markedly different temperatures from the gases issuing from the burners.

The advantages of the invention involve the accomplishments of the objects of the invention and the support of the sheets under better and more uniform conditions than has hereoftore been possible.

A particularly advantageous use of this invention is, in the manufacture of glass sheet wherein the sheet is formed, for instance by shaping molten glass between rollers, and drawn over the burning chambers of this invention. Such glass is very hot and mobile as first formed, and is progressively cooled until, at the discharge end of the tunnel it is relatively cool and capable of being handled without damage to its surface by ordinary handling machines. During the first, hottest, stage of the process, while the glass is undergoing surface leveling, the burners may be run at high temperature in order to avoid cooling the lower surface before it is leveled and in order to avoid establishing too great a difference of temperature between the upper and lower surfaces of the glass sheet. In an intermediate stage when leveling has been completed the burners may be run at lower temperature, allowing the lower face to cool appropriately. In the final stage the burners may be run at a temperature as low as will sustain combustion by injecting auxiliary gas at room temperature, providing a temperature sufficiently low to permit the transfer of the sheet to ordinary handling without damage to its surface.

By this invention glass sheet may be made and fire polished on both sides without coming in contact with any solid object between the shaping rollers and the receiving rollers.

As many apparently widely different embodiments of the present invention may be made without departing from the spirit and scope thereof, it is to be understood that the invention is not limited to the specific embodiments.

What is claimed is:

1. Apparatus for supporting moving flat glass out of contact with solid objects which comprises a multiplicity of cups having open ends aligned to define a common surface and extending substantially throughout the area of the glass which is to be supported, burner means inside each cup, means to supply fuel to each burner means, and means to exhaust spent gases between the cups.

2. Apparatus according to claim 1 in which the cups have horizontally aligned rims on cylindrical bodies.

3. Apparatus according to claim 1 in which the means to supply fuel includes a pressure equalizing chamber, means to supply the chamber with fuel, and conduit means connecting the chamber with the burners in the cups.

4. A method of supporting flat glass out of contact with solid objects which comprises burning a multiplicity of flames directly beneath the area of the glass which is to be supported, confining the flames and their products of combustion against lateral dispersion, and directing the products of combustion from the flames against the bottom of the flat glass.

5. Apparatus according to claim 1 which includes auxiliary means to inject a fluid into the products of combustion.

6. Apparatus according to claim 1 which includes a plurality of conduits directed into the burning gases, and means to force gas through the conduits into the hot gases of combustion.

7. Apparatus according to claim 1 which comprises a pressure chamber, conduits connected to the interior thereof and to the burning chambers, and means to protect the pressure chamber against the temperature existing beneath the orifices.

8. Apparatus according to claim 7 in which the means to protect comprises a thermally noncoductive layer interposed between the burning chamber and the pressure chamber.

9. Apparatus according to claim 5 in which the auxiliary means includes another pressure chamber, and conduit means extending therefrom to the burning chambers.

10. Apparatus according to claim 1 comprising an auxiliary orifice concentric to the orifice of the burning chamber, and means to force auxiliary fluids through the auixiliary orifice into the hot gases of combustion.

11. Apparatus according to claim 10 which includes wall means between the burning and auxiliary gases.

12. Apparatus according to claim 1, in which the lower part of the interior of the chambers is provided with means for reducing the cross section of flow.

13. Apparatus according to claim 12, in which said means for reducing the cross section of flow comprise a grid for distributing combustible gases.

14. Apparatus according to claim 1, in which the burning chambers are mounted on a bed forming a chest for supplying a combustible gas mixture.

References Cited

UNITED STATES PATENTS 2,952,307   9/1960   Schramm et al. ____ 158—110 X
3,223,501  12/1965   Fredley et al. _____ 65—25

DONALL H. SYLVESTER, *Primary Examiner.*

ARTHUR D. KELLOGG, *Assistant Examiner.*

U.S. Cl. X.R.

65—65, 182; 214—1